United States Patent
Gao et al.

(10) Patent No.: US 12,132,917 B2
(45) Date of Patent: Oct. 29, 2024

(54) PALETTE MODE VIDEO ENCODING UTILIZING HIERARCHICAL PALETTE TABLE GENERATION

(71) Applicant: ATI TECHNOLOGIES ULC, Markham (CA)

(72) Inventors: Wei Gao, Markham (CA); Yang Liu, Markham (CA); Ihab Amer, Markham (CA); Ying Luo, Markham (CA); Shu-Hsien Wu, Markham (CA); Edward Harold, Markham (CA); Feng Pan, Markham (CA); Crystal Sau, Markham (CA); Gabor Sines, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/029,730

(22) Filed: Sep. 23, 2020

(65) Prior Publication Data

US 2022/0094951 A1 Mar. 24, 2022

(51) Int. Cl.
*H04N 19/119* (2014.01)
*H04N 19/136* (2014.01)
(Continued)

(52) U.S. Cl.
CPC ......... *H04N 19/186* (2014.11); *H04N 19/119* (2014.11); *H04N 19/136* (2014.11);
(Continued)

(58) Field of Classification Search
CPC .. H04N 19/186; H04N 19/119; H04N 19/136; H04N 19/147; H04N 19/176; H04N 19/30; H04N 19/96
See application file for complete search history.

(56) References Cited

U.S. PATENT DOCUMENTS

| 10,390,028 B2 | 8/2019 | Sun et al. |
| 2003/0026476 A1* | 2/2003 | Shiiyama ............... G06T 3/4015 382/250 |

(Continued)

FOREIGN PATENT DOCUMENTS

EP 3051822 A1 8/2016

OTHER PUBLICATIONS

International Search Report and Written Opinion mailed Dec. 8, 2021 for PCT/IB21/058691, 14 pages.

(Continued)

*Primary Examiner* — Dave Czekaj
*Assistant Examiner* — Berteau Joisil

(57) ABSTRACT

An encoder encodes an image portion by recursively partitioning the portion into a partitioning hierarchy of levels. The top level has a single block representing the entire portion and each lower level has four smaller blocks representing a corresponding larger block at a higher level. A palette table is generated for each bottom-level block based on the pixels of the associated block. For each successively higher level, the encoder generates a palette table for each current-level block by selecting palette colors based on the palette colors from the four palette tables for the associated four blocks at the next-lowest level. A color index map is then generated based on a final palette table selected from the palette tables generated for the partitioning hierarchy. A representation of the portion is then encoded using the final palette table and the color index map to generate a corresponding segment of an encoded bitstream.

23 Claims, 5 Drawing Sheets

(51) Int. Cl.
*H04N 19/147* (2014.01)
*H04N 19/176* (2014.01)
*H04N 19/186* (2014.01)
*H04N 19/30* (2014.01)
*H04N 19/96* (2014.01)

(52) U.S. Cl.
CPC ......... *H04N 19/147* (2014.11); *H04N 19/176* (2014.11); *H04N 19/30* (2014.11); *H04N 19/96* (2014.11)

(56) References Cited

U.S. PATENT DOCUMENTS

| | | | | |
|---|---|---|---|---|
| 2006/0204086 A1* | 9/2006 | Gargi | ................... | H04N 1/644 |
| | | | | 382/232 |
| 2011/0150329 A1* | 6/2011 | Lepine | ................... | G06T 7/90 |
| | | | | 382/165 |
| 2013/0272621 A1* | 10/2013 | Lasserre | ............. | H04N 19/119 |
| | | | | 382/248 |
| 2016/0217341 A1* | 7/2016 | Hung | ................... | G06V 10/50 |
| 2018/0077411 A1* | 3/2018 | Gisquet | ................... | G06T 9/004 |
| 2020/0077095 A1 | 3/2020 | Chuang et al. | | |

OTHER PUBLICATIONS

International Preliminary Report on Patentability mailed Apr. 6, 2023 for PCT/IB21/058691, 9 pages.

Senanayake et al., "High performance hardware architectures for Intra Block Copy and Palette Coding for HEVC screen content coding extension", 2017 IEEE 28th International Conference On Application-Specific Systems, Architectures and Processors, IEEE, Jul. 10, 2017, doi: 10.1109/ASAP.2017.7995274, 6 pages.

Pu et al. "Palette Mode Coding in HEVC Screen Content Coding Extension", IEEE Journal On Emerging and Selected Topics in Circuits and Systems, vol. 6, No. 4, IEEE, Dec. 2016, doi: 10.1109/JETCAS.2016.2605661, 13 pages.

Extended European Search Report issued in Application No. 21871795, mailed Jul. 31, 2024, 10 pages.

* cited by examiner

PALETTE MODE VIDEO ENCODING UTILIZING HIERARCHICAL PALETTE TABLE GENERATION

BACKGROUND

Certain video applications involve the transmission of "screen content" (that is, computer-generated image content), such as remote desktop sharing, virtual desktop infrastructures for cloud computing, and cloud gaming applications. Such screen content is either transmitted by itself, or as hybrid content that represents a combination of screen content and camera-captured video content. However, unlike camera-captured video content, screen content, and particularly "desktop" screen content, usually is rich in text and other computer-generated graphics that present sharp edges with relatively little noise. Moreover, screen content generally exhibits a lower number of distinct colors within a local area of an image.

Some video encoding standards have been extended to leverage the relatively low number of colors and relatively-high contrast generally exhibited by screen content in comparison to camera-captured video to provide for more efficient encoding of screen content. For example, the ITU-T High-Efficiency Video Coding (HEVC) standard provides for a Screen Content Coding (SCC) extension that implements a Palette Mode that involves palette color selection followed by generation of a color index map based on the palette color selection. In this process, for each portion of an image containing screen content being encoded (that is, for each coding unit), the encoder identifies some top number of representative colors found in the portion (e.g., the top eight colors), and generates a palette table that indexes (that is, maps an index to) each of the identified representative colors. The encoder then replaces each pixel in the portion of the image with a corresponding index value of the palette color from the palette table that most closely matches the color of that pixel to generate a corresponding color index map for the image portion being encoded. The palette table and color index map are then encoded, along with information regarding pixels from the image portion that are excessively different from any of the identified palette colors (these pixels referred to as "Escape" pixels), to generate a corresponding segment of an encoded bitstream that is then transmitted to a destination device. The destination device then decodes the bitstream to obtain the palette table and color index map for the decoded block, and from these values and any associated decoded residuals, lossily or losslessly recover the original block. The Alliance for Open Media Video 1 (AV1) coding standard provides a similar palette mode implementation.

The conventional process for generating the palette table for a given image portion to be encoded entails generating a single histogram of all of the pixel colors of the entire image portion and then selecting the representative colors for the palette table from this histogram. While providing for a compact bitstream, this palette table generation process can be computationally intensive and thus requires considerable hardware resources in terms of silicon area, throughput, and power consumption. To illustrate, the HEVC-SCC standard described above provides for coding unit sizes of up to 128×128 pixels each, which means that for each such coding unit of an image to be encoded, the encoder implementing the conventional palette table generation process would need to process 16,384 pixels to generate the corresponding histogram for each 128×128 coding unit, of which there are hundreds or even thousands in any given image depending on the resolution of the image. This process is further complicated when the encoding system is configured to support multiple coding partitions concurrently, such as being able to support the encoding of screen-content video based on any or all of the typical 8×8, 16×16, 32×32, 64×64, and 128×128 coding unit partitions of the HEVC standard and other similar coding standards.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

FIGS. 4-1 and 4-2 are block diagrams illustrating an example implementation of the method of FIG. 2 using the example recursive partitioning of the coding unit of FIG. 3 in accordance with some embodiments.

DETAILED DESCRIPTION

Figure 1:
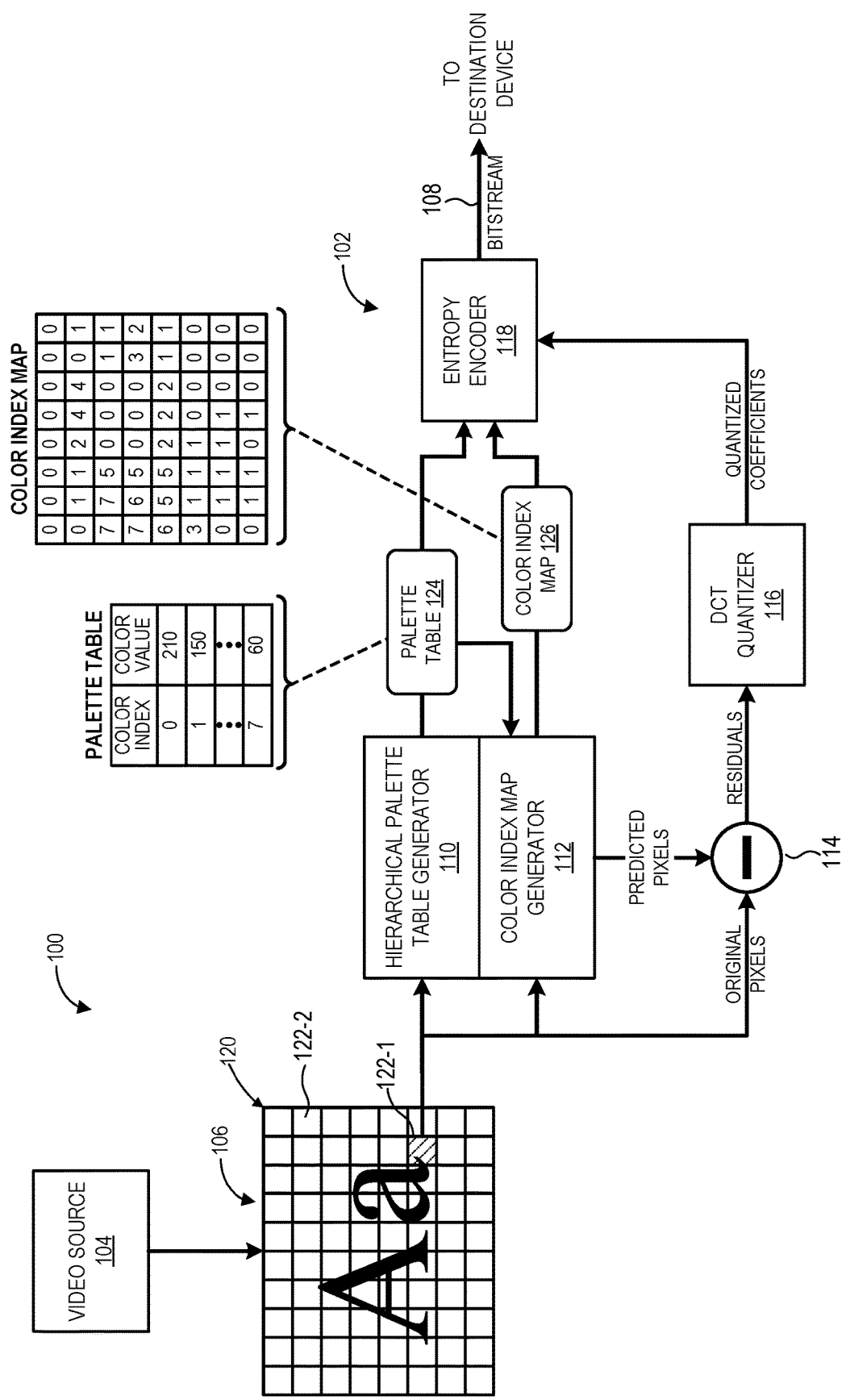
FIG. 1 is a block diagram of a source device with a palette-mode encoder utilizing hierarchical palette table generation for palette-mode encoding of video containing screen content in accordance with some embodiments.

The typical approach of palette table generation for a coding unit (CU) in palette-mode encoding based on histogram analysis or other clustering of every pixel represented in the CU often is computationally prohibitive, particularly for larger CU partitions or encoders that support multiple concurrent CU partitions. To reduce the computational complexity while retaining sufficient color-reproduction accuracy, systems and methods described herein utilize a hierarchical palette table generation process to efficiently generate a palette table for each of one or more selected partition sizes for a selected CU to be encoded in palette mode. In this approach, a selected CU is recursively partitioned at different levels of a partition hierarchy. At a top level the selected CU of K×K pixels is represented by a single block of K×K pixels. Each successive level below the top level has four smaller blocks of pixels representing a corresponding larger block of pixels at a next higher level. At a bottom level of the partitioning hierarchy, the encoder generates a palette table for each block at the bottom level. Each of these palette tables includes a set of palette colors representative of pixel colors present in the corresponding block, and in at least one embodiment are selected via histogram analysis of the pixel colors present in the block, via k-means, or via any of a variety of other clustering methods. Thereafter, for each successively higher level in the partitioning hierarchy, the encoder generates a palette table for each block at a current level by selecting palette colors for the palette table based on the palette colors from the four palette tables associated with the four blocks at the next-lower level that correspond to the block at the current level. This also may be performed via histogram collection or other clustering of the palette colors of the four palette tables. Then at the top level, a single palette table generated at this level from the four palette tables at the next-highest level. which the encoder uses to generate a color index map for the selected CU. The encoder then encodes a representation of the CU using the final palette table and the color index map to generate a corresponding segment of an encoded bitstream.

To illustrate using an example 32×32 coding unit partition (that is, K=32) and a minimum block size of 8×8 pixels, then the CU is designated as the top block at the top level, and for the next highest level the top block is into 4 second-level blocks of 16×16 pixels each, and each of these blocks is then partitioned into four third-level blocks of 8×8 pixels each. Starting at the lowest, or bottom, level (the third level in this example), the encoder generates an initial palette table for each of the blocks at this level using histogram analysis, k-means analysis, or other statistical analysis, resulting in four palette tables for the bottom level. For ease of reference, example implementations utilizing histogram collection (also identified as histogram analysis) are described herein, but it will be understood that reference to histogram collection/analysis shall include reference to any of a variety of clustering methods or other statistical methods, such as k-means analysis, unless otherwise noted. At the second-lowest partitioning hierarchy level, the encoder identifies a set of candidate colors from the palette colors represented in the four palette tables of the four constituent blocks at the bottom level that together form the block at the second-lowest level. The encoder determines an intermediate palette table for the block at the second-lowest level through statistical analysis of this set of candidate colors. This process is repeated for each of the three other blocks at the second-lowest level, resulting in four intermediate palette tables generated for the second-lowest level. Then, at the top level the encoder identifies a set of candidate colors from the palette colors represented in the four palette tables of the four constituent blocks at the second-lowest level that together form the single block at the top level. The encoder determines a palette table for this block (which represents the entire CU) through statistical analysis of this set of candidate colors. The encoder then estimates, for each partitioning hierarchy level, a rate-distortion cost for encoding the CU using the corresponding palette table at that level. The palette table requiring the lowest rate-distortion cost is then designated as a "final" palette table for the CU, and encoder then generates a color index map for the selected K×K coding unit using the final palette table and encodes the color index map, the final palette table, and any quantized residuals for any Escape pixels present to generate a corresponding portion of an encoded bitstream that can then be stored for later access or transmitted to a destination device, whereupon a decoder at the destination device decodes the bitstream to recover the encoded palette table, color index map, and quantized residuals for the coding unit and uses the recovered palette table, color index map, and residuals to recover the original CU, or a lossy representation thereof.

This hierarchical and recursive partitioning process for determining a palette table for the blocks of pixels at each level from the palette table generated for the constituent blocks at the next-lower level provides for efficient palette table generation through a reduction in the number of colors considered through integration of the palette color selection process at a lower level into the palette color selection process at a higher level. To illustrate, the conventional process for generating a palette table for a 64×64 CU would require an encoder to sort and count each of the 4,096 pixels in the CU to arrive at a palette table of, for example, eight representative colors. However, under the hierarchical palette color selection process described herein, only small subsets of pixels are sorted and counted on a relatively small block-by-block basis at the lowest level, and then only small subsets of representative colors of each block at one level are considered for the corresponding blocks at the next-highest level, resulting in fewer overall operations to arrive at a final palette table for a CU of a given size and thus a more efficient process to generate the palette table for the CU, while also permitting generation of a separate palette table at each level of the partitioning hierarchy that can be used for a separate partition size of a CU.

FIG. 1 illustrates a source device 100 having an encoding system 102 employing a palette-mode encoding process utilizing hierarchically- and recursively-generated palette tables in accordance with some embodiments. The source device 100 can include any of a variety of devices configured to encode video streams containing screen content, including a server, personal computer, tablet computer, cell phone, or other compute-enabled mobile device supporting any of a variety of applications that generate screen content for transmission to, or storage at, a display device. Such services include, for example, remote desktop services, wireless display services, screen sharing/collaboration services, cloud gaming services, and the like. The source device 100 includes a video source 104 and the encoding system 102, as well as various other components omitted from FIG. 1 for ease of illustration, including one or more wireless or wired network interfaces, input/output (I/O) devices and their controllers, one or more processors, memory and other storage components, and the like. The video source 104 operates to generate or otherwise provide a video stream composed of a series of images 106 (also commonly referred to as "pictures" or "frames") for encoding by the encoding system 102 into a corresponding bitstream 108 that is provided for transmission to a destination device via a network interface (not shown) or otherwise provided for output, such as for storage at a local or networked storage device (not shown) to be available for subsequent access. The video source 104 can include, for example, a graphics processing unit (GPU) operating to render some or all of the content included in each image 106, a decoder decoding previously encoded video data representing screen content or other image content, and the like.

In at least one embodiment, some or all of the images 106 included in the stream from the video source 104 are composed partly or fully of computer-generated screen content, which typically exhibits sharper contrast and fewer colors in a local area compared to camera-captured video imagery. Accordingly, the encoding system 102 is configured to provide palette-based encoding (or "palette mode" encoding) of those images 106 identified individually or as part of a corresponding stream as containing screen content. To this end, the encoding system 102 includes a hierarchical palette table generator 110 (hereinafter, "palette table generator 110" for purposes of brevity), a color index map generator 112, a residual generator 114, a discrete cosign transform (DCT) quantizer 116, and an entropy encoder 118. Some or all of the components 110, 112, 114, 116, and 118 can be implemented at the source device 100 as one or more processors executing software instructions stored in system memory or another non-transitory computer-readable storage medium and which are configured to manipulate the one or more processors to perform the processes described herein. In other embodiments, some or all of the components 110, 112, 114, 116, and 118 are implemented in hardcoded logic (e.g., an application-specific integrated circuit or ASIC), in programmable logic (e.g., a programmable logic array), or a combination thereof. Still further, in some embodiments, some or all of the components 110, 112, 114, 116, and 118 are implemented in combinations of one or more processors executing software and hardcoded or programmable logic.

Figure 2:
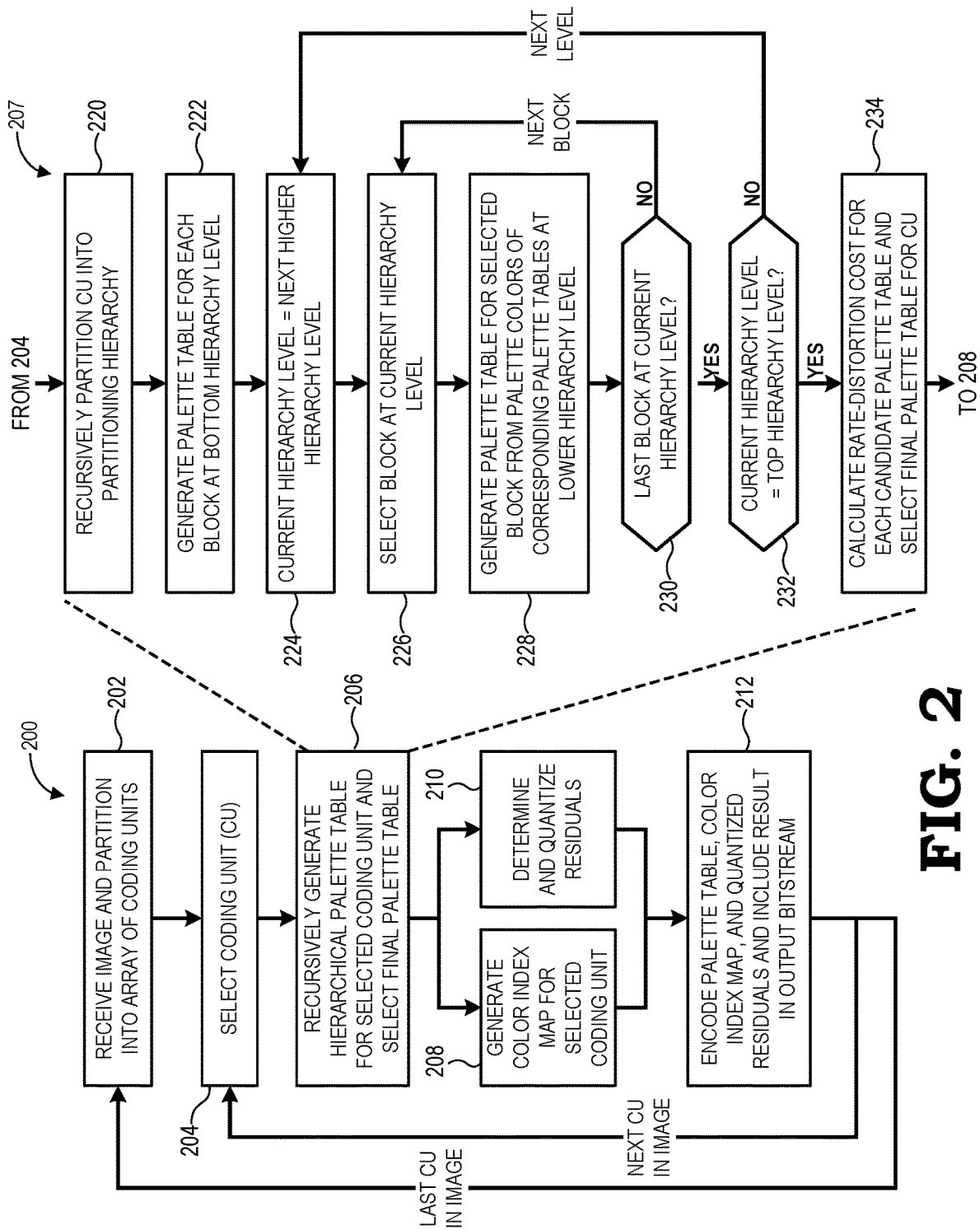
FIG. 2 is a flow diagram illustrating a palette-mode encoding process using hierarchical palette table generation implemented by the palette-mode encoder of FIG. 1 in accordance with some embodiments.

FIG. 2 illustrates a method 200 of operation of the encoding system 102 for palette-mode encoding of images containing screen content using a hierarchical- and recursive-palette table generation process in accordance with some embodiments. For ease of illustration, in describing the method 200 below reference is made to an example hierarchical partitioning of a CU depicted by FIG. 3 and to an example implementation of the method 200 depicted by FIGS. 4-1 and 4-2.

The method 200 initiates at block 202 with the encoding system 102 receiving an image 106 from the video source 104 as part of a stream of images 106. For example, in some implementations each image 106 is buffered in a frame buffer (not shown) of the source device 100 as it is generated or otherwise obtained by the video source 104. For the following, it is assumed that the received image 106 contains sufficient screen content to benefit from palette mode encoding. To illustrate, in some embodiments palette mode is employed on a CU-by-CU basis and the encoding system 102 calculates the rate-distortion cost of encoding a current CU using palette mode compared with the rate-distortion cost(s) of other prediction modes, and utilizes palette mode encoding for the current CU if it represents the lowest rate-distortion cost of the encoding options. Otherwise, in the event that palette mode is not indicated for the image 106, then the image 106 is encoded using a suitable conventional encoding technique, such as that promulgated by HEVC.

Further at block 202, the encoding system 102 logically partitions the J×K array of pixels represented by the image 106 into an array 120 (FIG. 1) of two-dimensional coding units (CUs) 122, such as CUs 122-1 and 122-2 of FIG. 1. In certain implementations, such as found in the ITU-T Rec. H.264 standards, the CUs are all of the same size (and with the CUs typically referred to instead as "macroblocks"). In other implementations, such as found in the ITU-T Rec. H.265 HEVC standards, an image can be partitioned into a plurality of coding tree units (CTUs), with each CTU being further partitioned into a plurality of CUs of different sizes. For ease of illustration, the CUs 122 of the array 120 for image 106 are depicted as being of the same size, but in other implementations the array 120 can be composed of CUs 122 of different sizes, such as in the aforementioned CTU configuration.

At block 204, the encoding system 102 selects a CU 122 (e.g., CU 122-1, FIG. 1) of the image 106 to be encoded. Consistent with various standards such as the HEVC standards, the image 106 is partitioned first into a plurality of slices, and then each slice partitioned into a plurality of CTUs, then each CTU partitioned into a plurality of CUs, and the selection of slice-CTU-CU then may proceed in a defined order. With a CU 122 selected, at block 206 the palette table generator 110 utilizes a recursive and hierarchical palette table generation process in which the CU 122 is recursively partitioned in a top-down approach into successive pixel blocks of smaller and smaller sizes at each partitioning level of a partitioning hierarchy until a minimum block size is reached at the lowest partitioning level. Then, using a bottom-up approach, the palette table generator 110 performs histogram collection or other clustering for the pixels of each block at the lowest partitioning level to determine a set of candidate colors for inclusion as palette colors in a corresponding palette table for each lowest-level block. For the second-lowest partitioning level, the palette colors from the palette tables of each of the multiple lowest-level blocks represented by a second-lowest level block serve as candidate colors for the second-lowest level block, and thus the palette table generator 110 performs histogram collection or other clustering for these candidate colors to identify the colors for inclusion in a palette table for the block at the second-lowest level. This process is performed for each block at the second-lowest level. The process of using the palette colors of each palette table generated for each constituent block at the next-lower level as candidate colors for selection for a palette table of a corresponding block of the next-higher level is repeated until the top level of the partitioning hierarchy (which represents the CU 122 in its entirety), at which point the palette table generator 110 generates a palette table for the top level through histogram collection or other clustering of the palette colors of the palette tables generated at the second-highest level of the partitioning hierarchy. That is, the palette table generator 110 generates intermediate palette tables for larger partitions of the CU 122 by integrating the palette tables of smaller partitions recursively and hierarchically. This avoids the computationally intensive conventional process of exhaustive sorting and processing of the entirety of the pixels of the CU 122 as one block to generate a palette table. With a candidate palette table generated for each partitioning level (e.g., 8×8 pixels, 16×16 pixels, 32×32 pixels, 64×64 pixels, 128×128 pixels, etc.), the palette table generator 110 or other component of the encoding system 102 then calculates a rate-distortion cost for encoding the CU 122 using a corresponding candidate palette table, with this calculation being performed for each candidate palette table. The encoding system 102 then selects as a "final" palette table 124 the candidate palette table representing the lowest rate-distortion cost for encoding the CU 122. An example implementation of the hierarchical palette table generation and selection process employed by the encoding system 102 at block 206 is described in more detail below with reference to expanded process flow 207 of FIG. 2.

With the final palette table 124 for the CU 122 determined using this hierarchical and recursive palette table generation and selection approach, at block 208 the color index map generator 112 performs prediction based on a comparison of each of the original pixels of the CU 122 to the palette colors represented in the palette table 124 to generate a color index map 126 representative of the pixels of the CU 122 and indexed to the final palette table 124. Any of a variety of standard or proprietary techniques can be employed to generate the color index map 126 from the final palette table 124. To illustrate, as is understood in the art, a palette table, such as the final palette table 124, includes a plurality of entries, with each entry having an associated index value and a corresponding palette color selected from candidate colors identified in histogram collection or other clustering of the color values of a corresponding pixel block. Each palette color is composed of, for example, three color components (RGB or YCbCr). Accordingly, to generate the color index map 126, for each pixel of the CU 122 the color index map generator searches the final palette table 124 for a corresponding palette color with minimum distortion, and replaces the pixel color with the index number associated with the selected palette number in the corresponding positional entry of the color index map 126. To illustrate, assume that the pixel at (1,1) (that is, row 1, column 1) of the CU 122-1 has a color that is closest to the palette color (R150, B50, G75) which is found at, for example, index 1 of the final palette table 124. In this case, the color index map generator 112 would place the index value of "1" at the (1,1) entry of the color index map 126 to represent that the color of the pixel (1,1) most closely resembles palette color the found at index 1 of the final palette table 124.

Further, in some lossless encoding implementations, the prediction performed by the color index map generator 112 identifies one or more pixels that were not sufficiently similar to a palette color and thus require the addition of a separate index in the final palette table 124 and corresponding identifying entries in the color index map 126 for representing such pixels, which typically are referred to as "escape pixels" and their corresponding indexes are thus referred to as "escape" indexes. In lossy encoding implementations, the escape pixels instead are either coded as one of the palette colors or are signaled explicitly after quantization, often depending on which approach provides the better rate-distortion tradeoff.

Concurrently with the color index map generation process of block 208, at block 210 the residual generator 114 compares the original pixel colors with their selected palette colors to generate residuals representing the differences. These residuals are then quantized by the DCT quantizer 116 to generate quantized DCT coefficients. At block 212 the entropy encoder 118 encodes the palette table 124, the color index map 126, and the quantized DCT coefficients for the selected CU 122 for encoding into a corresponding segment of the bitstream 108.

The process of selecting the next CU 122 from the image 106 to be encoded as represented by blocks 204-212 is repeated for each CU 122 of the image 106 to be palette-mode encoded. After all such CUs have been encoded, another iteration of method 200 is repeated starting at block 202 with the receipt of the next image 106 in the video stream being encoded for transmission or storage.

As for subsequent decoding of the encoded bitstream 108, any of a variety of standard or proprietary palette-mode decoding processes can be employed consistent with how the bitstream 108 was encoded, such as the process provided by HEVC-SCC. Such processes typically entail, for each segment of the bitstream 108 representing an encoded CU, a palette mode decoder decoding the segment to recover the palette table 124, the color index map 126, and the quantized DCT coefficients representing the CU. The quantized DCT coefficients are dequantized to obtain lossy or lossless representations of the residuals, and the recovered palette table 124 and the color index map are used, along with the residuals, to recover the array of pixels represented by the original CU 122, or a lossy representation thereof.

As noted above, the process of block 206 provides for the generation of the final palette table 124 using a hierarchical and recursive process that efficiently integrates intermediate palette tables generated for a lower level of a partitioning hierarchy to create intermediate palette tables at a higher level of the partitioning hierarchy, and from these candidate palette tables the selection of the final palette table 124 representing the lowest rate-distortion cost for use in encoding the CU 122. Expanded process flow 207 illustrates an example implementation of this process, with reference to an example hierarchical partitioning represented in FIG. 3 and an example performance of this process as represented in FIGS. 4-1 and 4-2.

The process of block 206 initiates at block 220 whereupon the CU 122 selected at block 204 is recursively partitioned into a partitioning hierarchy composed of the lowest level (or bottom level), a highest level (or top level), and if the depth of the partitioning hierarchy is more than two levels, one or more intermediate levels between the lowest and highest levels. The top level represents the pixel array of the CU 122 in its entirety as a single top-level block. For each successively-lower level of the partitioning hierarchy, the hierarchical palette table generator 110 partitions each block at the next-higher level into an associated set of four (4) blocks until, at the lowest level, a minimum block size of P×P pixels is reached, whereby P represents an integer number greater than 1, and in many implementations is a minimum CU size supported by the encoding standard being employed. For example, as HEVC provides for a minimum CU of 8×8 pixels in a CTU, the minimum block size P would be set to 8. As such, the number N of levels in a partitioning hierarchy for a CU 122 of K×K pixels is set based on the relationship of Equation 1 below:

$$K=P*2^{N-1}$$

Thus, if the minimum block size is 8×8 pixels (P=8) and the CU 122 is 16×16 pixels (K=16), there would be only two partition levels (N=2)—the top level and the bottom level. For a minimum block size of 8×8 pixels (P=8) and the CU 122 is 128×128 pixels, then there would be five partition levels (N=5)—the top level, the bottom level, and 3 intermediate levels therebetween.

Figure 3:
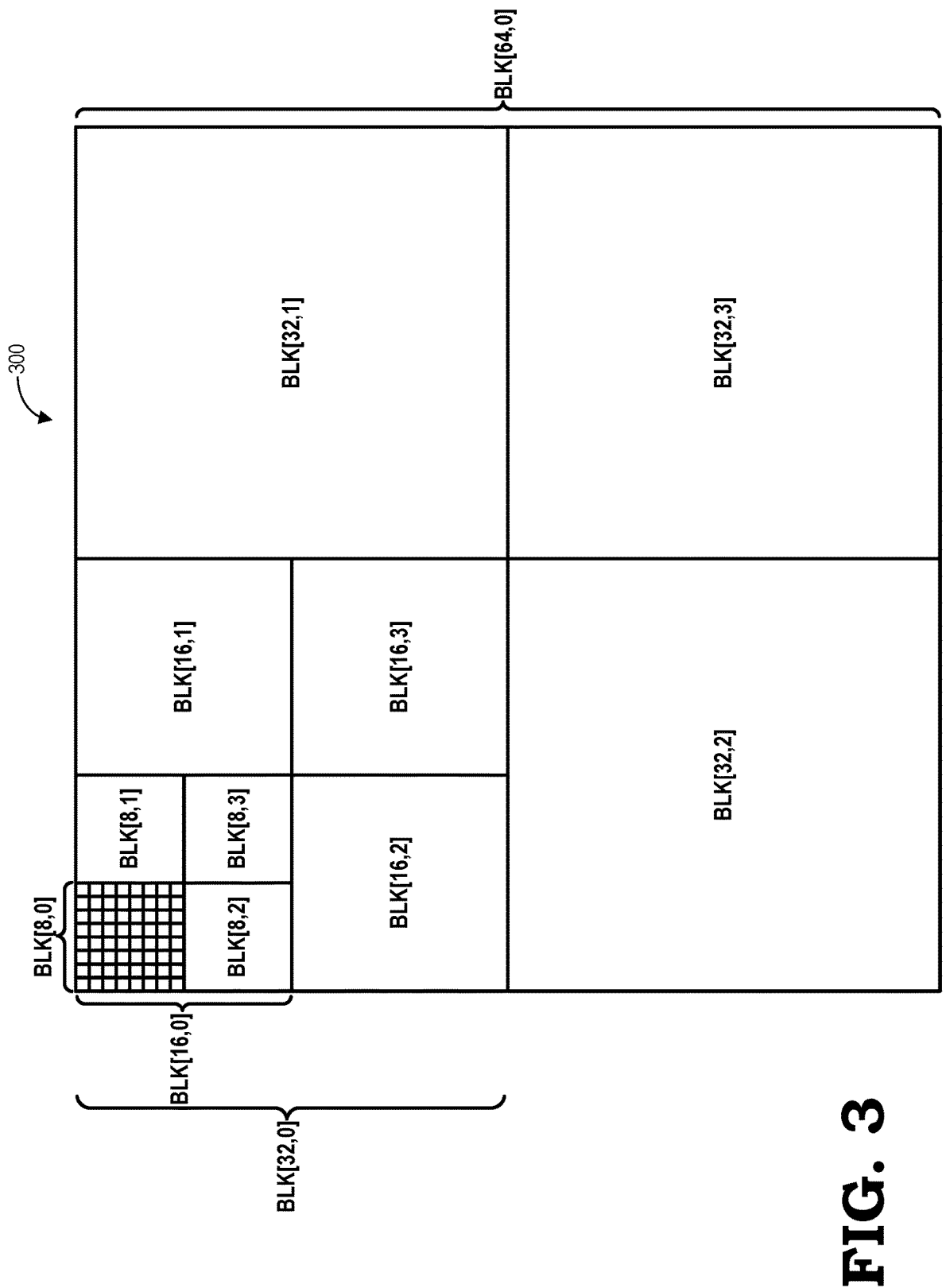
FIG. 3 is a diagram illustrating an example recursive hierarchical partitioning of a coding unit into sets of blocks of pixels at different levels of a hierarchy in accordance with some embodiments
Figures 1, 4:
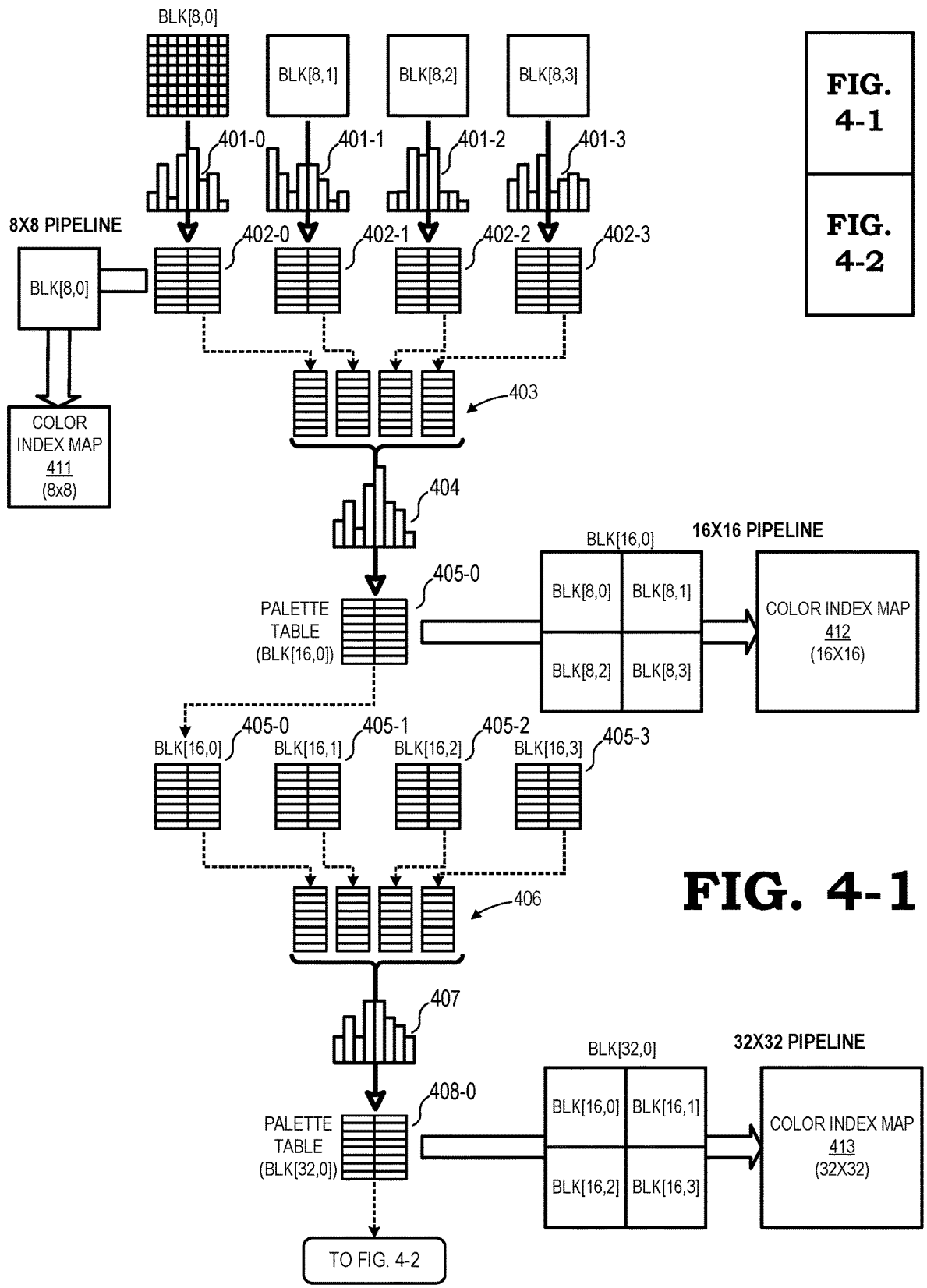
Figures 2, 4:
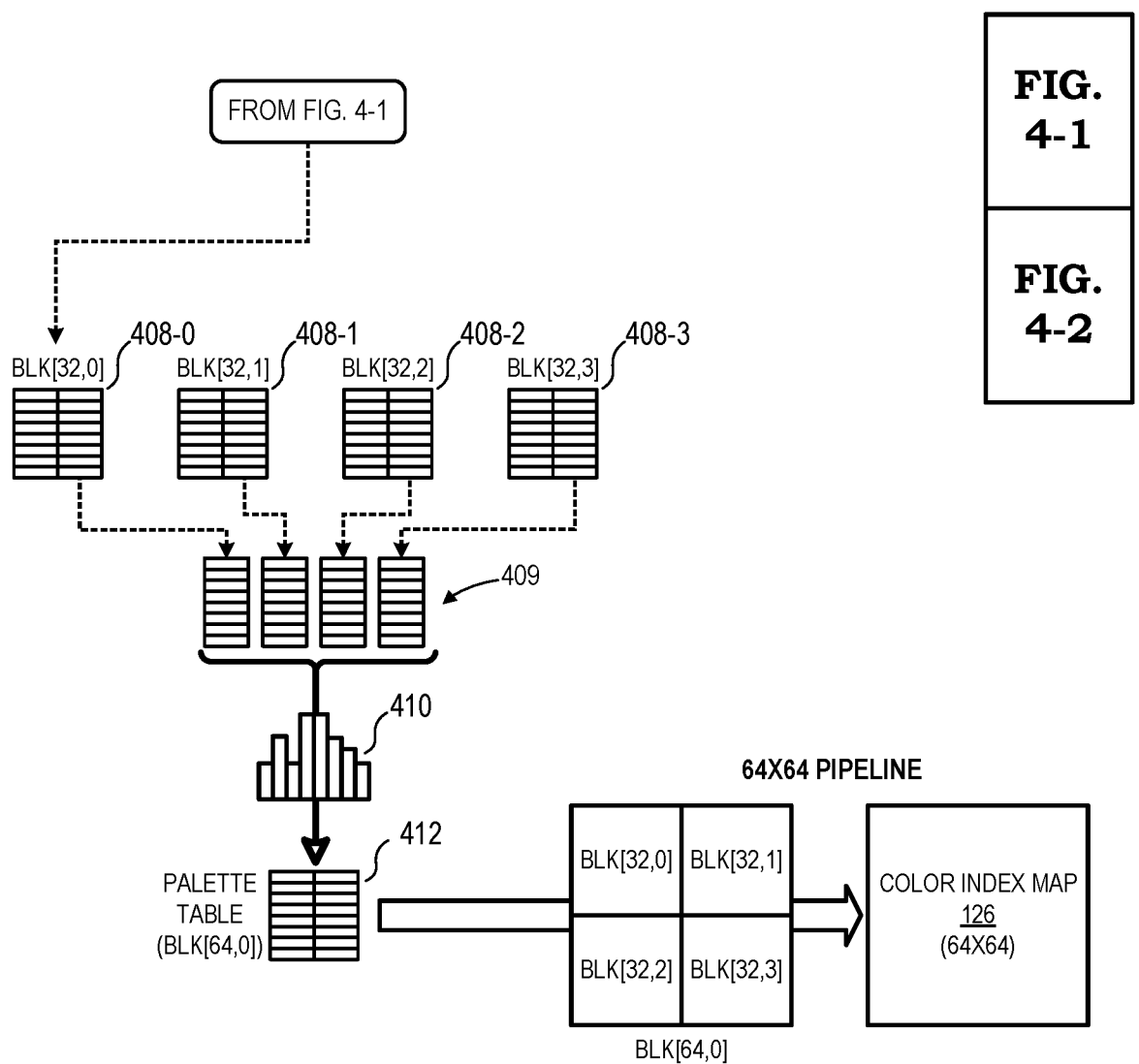

To illustrate, an example of this recursive partitioning is illustrated in FIG. 3. In the illustrated example partitioning hierarchy 300, a 64×64 pixel CU is recursively partitioned until a minimum block size of 8×8 pixels is reached. As such, the example partitioning hierarchy 300 has four partitioning layers (64=8*2^(4−1)→N=4). The entire 64×64 pixel array of the CU is considered to be a single block (BLK64) at the top level (level 1) of the partitioning hierarchy. At the first intermediate level (level 2), the 64×64 pixels of the CU are partitioned a corresponding set of four 32×32 blocks, BLK[32,0] to BLK[32,3]. At the second intermediate level (level 3), each of the 32×32 blocks at the first intermediate level is partitioned into a corresponding set of four 16×16 blocks, resulting in blocks BLK[16,0] to BLK[16,15] at the second intermediate level. As illustrated, the block BLK[32,0] at the first intermediate level (level 2) is partitioned into a corresponding set of blocks BLK[16,0], BLK[16,1], BLK[16,2], and BLK[16,3]. Likewise, the block BLK[32,1] at the first intermediate level (level 2) is partitioned into blocks BLK[16,4], BLK[16,5], BLK[16,6], and BLK[16,7], and so on. At the bottom level (level 4) of the partitioning hierarchy 300, each 16×16 block at the second intermediate block is partitioned into a corresponding set of four 8×8 blocks, resulting in blocks BLK[8,0] to BLK[8,63]. As illustrated, BLK[16,0] at the second intermediate level is partitioned into a set of blocks BLK[8,0] to BLK[8,3]. BLK[16,1] is likewise partitioned into a set of blocks BLK[8,4] to BLK[8,7], and so on.

Returning to FIG. 2, with the CU 122 recursively partitioned into pixel blocks of decreasing sizes from the top level to the bottom level of the partitioning hierarchy such that each block at a non-bottom level is represented by four smaller blocks at the next-lower level, at block 222 the palette table generator 110 sets the current level being processed to the bottom level of the partitioning hierarchy and generates a separate palette table for each block of the lowest level of the partitioning hierarchy. In at least one embodiment, the palette generation process for each block at the lowest level includes performing histogram collection on the pixels in each block based on binning of pixel colors to generate a corresponding histogram of pixel colors present in the pixels of the block, and then selecting a subset of X of the pixel colors present based on the sizes of the corresponding bins (that is, the number of pixel colors that fall within each bin) as the palette colors of the corresponding palette table. The value X is selectable or otherwise programmable, and typically is selected based on various parameters, including the minimum block size, encoding efficiency, encoding bit rate, and the like. For example, a palette table often is limited to sixteen palette colors or fewer, with 8 or 16 (that is, X=8 or X=16) being frequent configurations. Thus, in the example partitioning hierarchy 300 of FIG. 3, the palette table generator 110 would separately perform the sorting and other operations utilized for histogram analysis on each of the sixty-four 8×8 blocks of pixels at the bottom level (level 4) to generate 64 separate histograms, and from these 64 separate histograms generate 64 separate palette tables, each palette table including up to, for example, 16 indexed palette colors.

Thereafter, at block 224 the palette table generator 110 moves up one level (that is, the current level being processed is set to the next-higher level). At block 226, the palette table generator 110 selects a block of the current level being processed based on a specified selection order (e.g., scan horizontal or scan vertical). At block 228, the palette table generator 110 generates a palette table for the selected block at the current level from the palette colors of the palette tables generated for the set of blocks at the previous (or lower) level that corresponds to the selected block of the current level. In at least one embodiment, the palette table for the selected block at the current level is generated from the palette tables of the corresponding set of lower-level blocks by combining the palette colors of the lower-level blocks into a set of candidate palette colors, and then performing histogram collection of this set of candidate palette colors to identify the X histogram bins with the most frequently-occurring palette colors, and generating a palette table for the selected block at the current level to include X palette colors based on the identified X histogram bins. For the first iteration of block 228 (for the lowest intermediate level), this entails using the palette colors implemented in the palette tables for the four lowest-level blocks generated at block 222. For subsequent iterations (for higher intermediate levels or the top level), this entails using the palette colors implemented in the palette tables for the four next-lower-level blocks generated at a previous iteration of block 228. Thus, it will be appreciated that rather than performing histogram collection on all of the pixels of the CU that are represented by the selected block at the current level, histogram collection is instead performed only on the palette colors of the palette tables of the lower-level blocks, which at higher levels of the partitioning hierarchy, in turn, integrate the palette colors of the palette tables of still-further lower level blocks. As such, significantly fewer operations are needed to generate the histogram and thus the palette table for an J×J block of pixels using this recursive approach compared to a conventional all-pixel histogram analysis approach.

With the palette table for the selected block at the current level generated, at block 230 the palette table generator 110 determines whether a separate palette table for each block at the current level has been generated. If not, then another iteration of the block-selection and per-block palette table generation process of blocks 226, 228, and 230 is performed for the next block of the CU at the current partitioning level. Otherwise, if all blocks at the current partitioning level have palette tables generated for them, then at block 232 the palette table generator 110 determines whether any higher partitioning levels are remaining; that is, whether the current level is the top level of the partitioning hierarchy. If not, then the palette table generator 110 returns to block 224 and sets the current level being processed to the next higher level in the partitioning hierarchy and then another iteration of the block-selection and per-block palette table generation process of blocks 226-332 for the current level being processed.

Otherwise, if the palette table generator 110 has ascended the partitioning hierarchy for the CU 122 being encoded and is at the top level of the hierarchy, then at block 234 the encoding system 102 designates the palette table generated at each level of the partitioning hierarchy as a candidate palette table, and then calculates the rate-distortion cost for encoding the CU for each of the candidate palette tables. The candidate palette table requiring the lowest rate-distortion cost for encoding the CU 122 is designated as the final palette table 124 for the CU 122, and the final palette table 124 is then used by the color index map generator 112 for generating the corresponding color index map 126 for the CU 122 as described above with reference to block 208.

Turning now to FIGS. 4-1 and 4-2, an example implementation of the method 200 of FIG. 2 using the example partitioning hierarchy 300 for a 64×64 CU as shown in FIG. 3. In this example, each palette table contains up to 16 palette colors (that is, X=16). For a 64×64 pixel CU, the lowest partitioning level (level 4) generates a set of four 8×8 blocks for each 16×16 block of the next-highest level (level 3). Each 8×8 block is statistically analyzed to generate a corresponding histogram of candidate pixel colors, and the histogram is used to identify up to 16 of most-frequently occurring pixel colors in the 8×8 block as the palette colors to be indexed in the palette table for that block. To illustrate, FIG. 4-1 depicts histograms 401-0, 401-1, 401-2, and 401-3 being collected for blocks BLK[8,0], BLK[8,1], BLK[8,2], and BLK[8,3], respectively. The palette table generator 110 generates palette tables 402-0, 402-1, 402-2, 401-3 with up to 16 palette colors each selected based on the histograms 401-0, 401-1, 401-2, and 401-3, respectively. This same process is performed for each of the other fifteen sets of four 8×8 blocks, resulting in a total of 64 palette tables generated from the 64 8×8 blocks (BLK[8,0] to BLK[8,63]) at the bottom level (level 5) of the partitioning hierarchy 300.

Then, at the lowest intermediate level (level 3) of the partitioning hierarchy 300, the palette table generator 110 generates a partitioning table for each of the sixteen 16×16 blocks (BLK[16,0] to BLK[16,15]) through integration of the four partitioning tables generated for the four 8×8 blocks at the bottom level that corresponding to the second level block. To illustrate, in FIG. 4-1 the indexed palette colors of each of the palette tables 402-0 to 402-3 are combined into a set 403 of up to 64 candidate colors (that is, up to 16 palette colors per bottom-level palette table*4 bottom-level palette tables). The palette table generator 110 analyzes this set 403 to generate a histogram 404 (or other clustering) representative of the frequencies of occurrence of the candidate colors in the set 403 and then uses up to 16 of the most represented pixel colors in the histogram 404 to generate an intermediate palette table 405-0 for the 16×16 block BLK[16,0] at the second level (level 3) that represents the four 8×8 blocks BLK[8,0] to BLK[8,3] at the bottom level. This process is likewise performed for the other 15 16×16 blocks (BLK[16,1] to BLK[16,15]) at the lowest intermediate level. The result is four intermediate-level palette blocks 405-0, 405-1, 405-2, and 405-3.

Moving up to the highest intermediate level (level 2) in the partitioning hierarchy 300, the palette table generator 110 generates a partitioning table for each of the four 32×32 blocks (BLK[32,0] to BLK[32,3]) through the integration of the four partitioning tables generated for the four 16×16 blocks at the lowest intermediate level (level 3) that corresponding to the third-level block. To illustrate, in FIG. 4-1 the indexed palette colors of each of the palette tables 405-0 to 405-3 are combined into a set 406 of up to 64 candidate colors. The palette table generator 110 analyzes this set 406 to generate a histogram 407 (or other clustering) representative of the frequencies of occurrence of the candidate colors in set 406, and then uses up to 16 of the most represented pixel colors in the histogram 407 to generate an intermediate palette table 408-0 for the 32×32 block BLK [16,0] that represents the four 8×8 blocks BLK[8,0] to BLK[8,3] at the bottom level. This process is likewise performed for the other three 32×32 blocks (BLK[32,1] to BLK[32,3]) at the highest intermediate level. Turning to FIG. 4-2, the result is four intermediate-level palette blocks 408-0, 408-1, 408-2, and 408-3.

At this point, the palette table generator 110 has progressed to the highest, or top, level (level 1) of the partitioning hierarchy 300 for the CU 122. Accordingly, the palette table generator 110 generates a top palette table 412 for the top partitioning hierarchy through the integration of the four partitioning tables 408-0 to 408-3 generated for the four 32×32 blocks at the highest intermediate level (level 2) by combining the palette colors of the palette tables 408-0 to 408-3 into a set 409 of up to 64 candidate colors. The palette table generator 110 analyzes this set 409 to generate a histogram 410 (or other clustering) representative of the frequencies of occurrence of the candidate colors in set 409, and then uses up to 16 of the most represented pixel colors in the histogram 410 to generate the top palette table 412.

As the example described above illustrates, the process of generating the top palette table 412 involves 64 instances of histogram collection on a 64-pixel set, followed by three iterations of histogram collection on up to 64 candidate palette colors from lower-level palette tables. It will be appreciated that this is less computationally complex than a conventional approach of a single histogram collection on the entire set of 4,096 pixels represented in the 64×64 pixel CU of the example above. Moreover, this hierarchical approach facilitates selective use of different sized partitions to more efficiently encode a CU based on rate-distortion analysis of encoding of the CU using each of the different palette tables at the different partitioning levels. As such, each of the palette tables 402-0, 402-1, 402-2, 402-3, 405-0, 408-0, and 412 represents a candidate palette table that may be utilized as the final palette table 124 used to encode the CU 122. Accordingly, for each of these candidate palette tables, the encoding system 102 can calculate a respective rate-distortion cost for encoding the CU 122 using the candidate palette table and select an intra-encoding pipeline partition size based on which candidate palette table provides the lowest rate-distortion cost.

To illustrate, for an 8×8 intra encoding pipeline for encoding the CU, the hierarchical partitioning devolves to a single level, with the palette table generated for the 8×8 block at this level (e.g., palette table 402-0 generated for BLK[8,0]) can be used to generate a color index map 411 representing the CU. Likewise, for a 16×16 intra encoding pipeline for encoding the CU, the palette table generated for a 16×16 partition level (e.g., palette table 405-0 for BLK [16,0]) can be used to generate a color index map 412 representing the CU. Likewise, for a 32×32 intra encoding pipeline for encoding CUs, the palette table generated for a 32×32 partition level (e.g., palette table 408-0 for BLK[32, 0]) can be used to generate a color index map 413 representing the CU, and so on. In the example of FIGS. 4-1 and 4-2, the palette table 412 has the lowest rate-distortion cost, and thus the palette table 412 is employed as the final palette table 124 for encoding the CU in a 64×64 intra encoding pipeline to generate the color index map 126.

In some embodiments, the systems and techniques described above are implemented using one or more integrated circuit (IC) devices (also referred to as integrated circuit packages or microchips), such as the encoding system 102 described above with reference to FIGS. 1 to 4-2. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or another instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for encoding an image containing screen content at a source device, the method comprising:
   for a selected portion of the image, recursively partitioning the selected portion of the image into a partitioning hierarchy composed of a plurality of levels, wherein a top level of the partitioning hierarchy has a single block representing an entire set of pixels of the selected portion of the image and each level below the top level has four smaller blocks of pixels representing a corresponding larger block of pixels at a next higher level;
   at a bottom level of the partitioning hierarchy, generating a palette table for each block at the bottom level, the palette table comprising a set of palette colors representative of pixel colors present in a corresponding block;
   for each successively higher level in the partitioning hierarchy, generating a palette table for each block at a current level by selecting palette colors for the palette table based on the palette colors from four palette tables associated with four blocks at a next-lower level that correspond to the block at the current level;
   selecting, from the palette tables generated for the plurality of levels of the partitioning hierarchy, a final palette table;
   generating a color index map for the selected portion of the image based on the final palette table; and
   encoding a representation of the selected portion of the image using the final palette table and the color index map to generate a corresponding segment of an encoded bitstream for output by the source device.

2. The method of claim 1, wherein generating a palette table for each block at the bottom level comprises:
   generating a first histogram representing a frequency of occurrence of binned pixel colors for pixels of the block; and
   selecting for indexing in the palette table up to a specified number of palette colors based on the first histogram.

3. The method of claim 2, wherein generating a palette for a block at a higher level in the partitioning hierarchy comprises:
   grouping palette colors of each palette table of four lower-level blocks associated with the block at the higher level into a set of candidate pixel colors;
   generating a second histogram representing a frequency of occurrence of binned candidate pixel colors; and
   selecting for indexing in the palette table up to the specified number of palette colors based on the second histogram.

4. The method of claim 1, wherein generating a palette table for a block at a higher level in the partitioning hierarchy comprises:
   grouping palette colors of each palette table of four lower-level blocks associated with the block at the higher level into a set of candidate pixel colors;
   generating a clustering representing a frequency of occurrence of binned candidate pixel colors; and
   selecting for indexing in the palette table up to a specified number of palette colors based on the clustering.

5. The method of claim 1, wherein:
   blocks at the bottom level have a block size of P×P pixels;
   the selected portion of the image has a size of K×K pixels; and
   a number N of levels in the partitioning hierarchy is represented in an expression $K=P*2^{(N-1)}$.

6. The method of claim 1, wherein selecting the final palette table comprises:
   determining, for each candidate palette table, a corresponding rate-distortion cost for encoding selected the portion of the image using the candidate palette table; and
   selecting as the final palette table the candidate palette table having a lowest corresponding rate-distortion cost.

7. The method of claim 1, wherein the selected portion of the image is a coding unit of a coding tree unit.

8. A device for encoding an image containing screen content, the device comprising:
   a palette-mode encoder configured to:
      for a selected portion of the image, recursively partition the selected portion of the image into a partitioning hierarchy composed of a plurality of levels, wherein a top level of the partitioning hierarchy has a single block representing an entire set of pixels of the selected portion of the image and each level below the top level has four smaller blocks of pixels representing a corresponding larger block of pixels at a next higher level;
      at a bottom level of the partitioning hierarchy, generate a palette table for each block at the bottom level, the palette table comprising a set of palette colors representative of pixel colors present in a corresponding block;
      for each successively higher level in the partitioning hierarchy, generate a palette table for each block at a current level by selecting palette colors for the palette table based on the palette colors from four palette tables associated with four blocks at a next-lower level that correspond to the block at the current level;
      selecting a final palette table from the palette tables generated for the plurality of levels of the partitioning hierarchy;

generate a color index map for the selected portion of the image based on the final palette table; and encode a representation of the selected portion of the image using the final palette table and the color index map to generate a corresponding segment of an encoded bitstream.

9. The device of claim 8, wherein the palette-mode encoder is configured to generate a palette table for each block at the bottom level by:

generating a first histogram representing a frequency of occurrence of binned pixel colors for pixels of the block; and selecting for indexing in the palette table up to a specified number of palette colors based on the first histogram.

10. The device of claim 9, wherein the palette-mode encoder is configured to generate a palette table for a block at a higher level in the partitioning hierarchy by:

grouping palette colors of each palette table of four lower-level blocks associated with the block at the higher level into a set of candidate pixel colors;

generating a second histogram representing a frequency of occurrence of binned candidate pixel colors; and selecting for indexing in the palette table up to the specified number of palette colors based on the second histogram.

11. The device of claim 8, wherein the palette-mode encoder is configured to generate a palette table for a block at a higher level in the partitioning hierarchy by:

grouping palette colors of each palette table of four lower-level blocks associated with the block at the higher level into a set of candidate pixel colors;

generating a clustering representing a frequency of occurrence of binned candidate pixel colors; and selecting for indexing in the palette table up to a specified number of palette colors based on the clustering.

12. The device of claim 8, wherein the palette-mode encoder is to select the final palette table by:

determining, for each candidate palette table, a corresponding rate-distortion cost for encoding the selected portion of the image using the candidate palette table; and selecting as the final palette table the candidate palette table having a lowest corresponding rate-distortion cost.

13. The device of claim 8, wherein the palette-mode encoder comprises at least one processor and a memory to store a set of instructions executable by the at least one processor.

14. A method for encoding an image containing screen content at a source device, the method comprising:

generating a palette table for each of a plurality of partitions of a partition hierarchy for a selected portion of the image by recursively using palette colors selected for palette tables for a set of smaller partitions of the selected portion of the image as candidate colors for a larger partition of the selected portion of the image, wherein the partition hierarchy includes a plurality of levels with a top level of the plurality of levels having at least one block representing an entire set of pixels of the selected portion of the image and each level of the plurality of levels below the top level having two or more smaller blocks of pixels representing a corresponding larger block of pixels at a next higher level;

generating a color index map for the selected portion of the image based on a palette table selected from the palette tables generated for the selected portion of the image; and encoding a representation of the selected portion of the image using the selected palette table and the color index map to generate a corresponding segment of an encoded bitstream for output by the source device.

15. The method of claim 14, wherein generating a palette table for a smallest partition of the selected portion of the image comprises:

generating a first histogram representing a frequency of occurrence of binned pixel colors for pixels of the smallest partition; and selecting for indexing in the palette table up to a specified number of palette colors based on the first histogram.

16. The method of claim 15, wherein generating a palette table for a partition of the selected portion other than the smallest partition comprises:

grouping palette colors of each palette table of associated next-smaller partitions into a set of candidate pixel colors;

generating a second histogram representing a frequency of occurrence of binned candidate pixel colors; and selecting for indexing in the palette table up to the specified number of palette colors based on the second histogram.

17. The method of claim 14, wherein the selected palette table is selected by:

determining, for each candidate palette table, a corresponding rate-distortion cost for encoding the selected portion of the image using the candidate palette table; and selecting as the selected palette table the candidate palette table having a lowest corresponding rate-distortion cost.

18. The method of claim 14, wherein the selected portion of the image is a coding unit of a coding tree unit.

19. A device for encoding an image containing screen content, the device comprising:

a palette-mode encoder configured to:

generate a palette table for each of a plurality of partitions of a partition hierarchy for a selected portion of the image by recursively using palette colors selected for palette tables for a set of smaller partitions of the selected portion of the image as candidate colors for a larger partition of the selected portion of the image, wherein the partition hierarchy includes a plurality of levels with a top level of the plurality of levels having at least one block representing an entire set of pixels of the selected portion of the image and each level of the plurality of levels below the top level having two or more smaller blocks of pixels representing a corresponding larger block of pixels at a next higher level;

generate a color index map for the selected portion of the image based on a palette table selected from the palette tables generated for the selected portion of the image; and encode a representation of the selected portion of the image using the selected palette table and the color index map to generate a corresponding segment of an encoded bitstream for output by the device.

20. The device of claim 19, wherein the palette-mode encoder is configured to generate a palette table for a smallest partition of the selected portion of the image by:

generating a first histogram representing a frequency of occurrence of binned pixel colors for pixels of the smallest partition; and selecting for indexing in the palette table up to a specified number of palette colors based on the first histogram.

21. The device of claim 20, wherein the palette-mode encoder is configured to generate a palette table for a partition of the selected portion other than the smallest partition by:
  grouping palette colors of each palette table of associated next-smaller partitions into a set of candidate pixel colors;
  generating a second histogram representing a frequency of occurrence of binned candidate pixel colors; and
  selecting for indexing in the palette table up to the specified number of palette colors based on the second histogram.

22. The device of claim 19, wherein the palette-mode encoder is configured to select the selected palette table by:
  determining, for each candidate palette table, a corresponding rate-distortion cost for encoding the selected portion of the image using the candidate palette table; and
  selecting as the selected palette table the candidate palette table having a lowest corresponding rate-distortion cost.

23. The device of claim 19, wherein the palette-mode encoder comprises at least one processor and a memory to store a set of instructions executable by the at least one processor.

* * * * *